United States Patent [19]

Bodewes

[11] Patent Number: 4,956,922
[45] Date of Patent: Sep. 18, 1990

[54] BUBBLE INCLINATION GAUGE INCLUDING A CENTRAL SHIELD FOR LIGHT-EMITTING AND LIGHT-DETECTING MEANS

[75] Inventor: Johannes W. M. Bodewes, Beverwijk, Netherlands

[73] Assignee: Sopha Bodewes-Tunhau, Beverwijk, Netherlands

[21] Appl. No.: 383,740

[22] Filed: Jul. 3, 1989

[30] Foreign Application Priority Data

Jul. 1, 1988 [NL] Netherlands ............... 8801678

[51] Int. Cl.$^5$ .................. G01C 9/06; G01C 9/34
[52] U.S. Cl. .................. 33/366; 33/348.2; 33/DIG. 3
[58] Field of Search ............ 33/366, DIG. 3, 348, 33/348.2

[56] References Cited

U.S. PATENT DOCUMENTS

| 3,172,212 | 5/1962 | Pappas | 33/366 |
|---|---|---|---|
| 3,324,564 | 4/1963 | Wright et al. | 33/366 |
| 3,371,424 | 3/1968 | Sweet | 33/366 |
| 4,164,077 | 8/1979 | Thomas | 33/366 |
| 4,484,393 | 11/1984 | LaFreniere | 33/348.2 |
| 4,625,423 | 12/1986 | Sackett | 33/366 |

FOREIGN PATENT DOCUMENTS

| 0168150 | 1/1986 | European Pat. Off. | |
| 0157934 | 12/1982 | Fed. Rep. of Germany | 33/366 |
| 60-252215 | 12/1985 | Japan | |
| 154030 | 4/1963 | U.S.S.R. | 33/366 |

Primary Examiner—William A. Cuchlinski, Jr.
Assistant Examiner—Alvin Wirthlin
Attorney, Agent, or Firm—Young & Thompson

[57] ABSTRACT

Inclination gauge having a reservoir filled with liquid and containing a gas bubble. The position of the gas bubble is detected by light detecting devices by which light going through the completely filled tube has a different convergent nature than light going through the tube partially filled with liquid and partially filled with gas. On the centerline of the light emitting and light detecting devices, between the reservoir and the light detecting devices, a shield is provided.

7 Claims, 2 Drawing Sheets

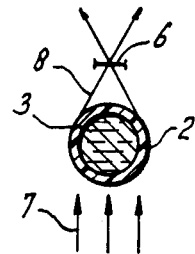
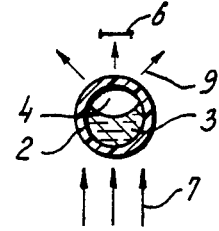
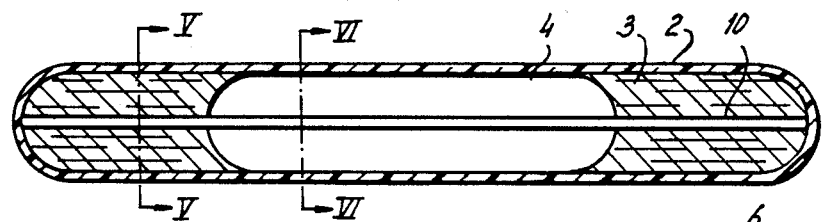
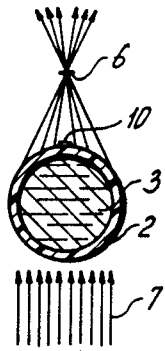
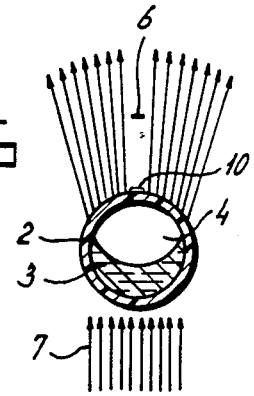

BUBBLE INCLINATION GAUGE INCLUDING A CENTRAL SHIELD FOR LIGHT-EMITTING AND LIGHT-DETECTING MEANS

BACKGROUND OF THE INVENTION

The invention relates to an inclination gauge comprising a reservoir containing a clear liquid and a gas bubble and light emitting and light detecting means arranged at opposed positions with regard to said reservoir. It is intended to convert the movement of the gas bubble in the reservoir to an electric signal. By this it is no longer necessary to monitor directly the gas bubble in the reservoir. Also it is possible to provide self-adjusting devices.

From U.S. Pat. No. 4,625,423 it is known to direct a beam of light through a tubular reservoir containing either liquid or a gas volume. When light is transmitted through the liquid a converging effect is obtained. When light traverses to the gas volume a non converging beam leaving the reservoir is realized. By monitoring the change in light intensity at the spot of the light dependent resistance, information can be obtained with regard to the position of the gas volume in the reservoir. However, the transition from converging to parallel and diverging is a continuous process. This means that only by considerable amplification of the light dependent resistance can an exact prediction be obtained about the position of the inclination gauge. However, if there are slight changes in the light emitting source and/or the transparency of the reservoir and/or its contents, the results of the measurements will be affected. This means that this device is not reliable in long term.

SUMMARY OF THE INVENTION

It is the main purpose of the invention to obviate this problem. This is realized with an inclination gauge comprising a reservoir containing a clear liquid and a gas bubble, light emitting and light detecting means arranged at opposite positions with regard to said reservoir, the refractory index of the liquid, of the gas and of the tube material being chosen such that the light going through the reservoir completely filled with liquid follows a trajectory substantially differing from the trajectory followed by light traversing the reservoir at least partially filled with gas, characterized in that on the center line from the light emitting and detecting means near the point of egress of the light from the reservoir a shield is provided.

If e.g. the light is converging as with the U.S. Pat. No. 4,625,423 device when completely filled with liquid, despite of the shield provided the light detecting means will receive a strong focussed light beam. However, as soon as the beams emitting from the reservoir are parallel or diverging no light at all will be incident at the light detecting means. This means that because of the shield provided by the invention a kind of on/off effect is obtained for the light impinging the light detecting means. Even if the light source and/or the light properties of the reservoir and/or the contents slightly change during production or use, this has no effect on this on/off effect. This means that it is always guaranteed that optimum detection is obtained. Also it is no longer necessary to considerably amplify the signal obtained from the light detecting means. Preferably the surface area of the shield is at least as large as the effective surface area of said light detecting means.

If the inclination gauge comprises a reservoir in which the gas bubble in the balanced position does not completely fill the cross section of the reservoir, problems might arise if one or two LDR's Light Dependent Resistors) are used. These LDR's only measure the surface area lightened. If the reservoir according to the invention with a gas bubble not completely filling the cross section of the reservoir is tilted to one side the LDR on that side will first register complete darkness or light. However, after further tilting the reservoir gas will accumulate near one end and fill the cross section of the reservoir completely by which the length of the gas bubble decreases and so an error signal can be obtained. To obviate this problem according to a further embodiment of the invention said light detecting members comprise at least three light sensitive means arranged in line, wherein the outermost ones have a relatively large extent and the center one has a relatively smaller extent. The extent of the outermost light sensitive members preferably substantially equals the length of the gas bubble in the balanced position. By having an intermediate light detecting means with a relatively small dimension the problem described above is obviated. The signal obtained from the light detecting means can be processed in any known way to display a signal or to provide an acoustical signal or both. The acoustical means can be deviced such that when moving from one extremity of the inclination gauge to the other, first a first signal is produced having a first frequency with first constant intervals between signal periods, after which a second signal is produced having the first frequency and second variable intervals between signal periods, said intervals decreasing towards the third signal, said third signal being continuous and having said first or a second frequency, after which a fourth signal is produced having a second frequency and third variable intervals between signal periods, said intervals increasing towards the fifth signal, said fifth signal having the second frequency and fourth constant intervals between signal periods.

The invention also relates to a device for measuring the movement of an object comprising the inclination gauge as described herein. This can e.g. be an acceleration gauge.

The invention will be described in further detail with reference to the drawing in which a preferred embodiment is shown and wherein:

FIG. 1 shows a trajectory of light followed according to the prior art with a completely liquid filled reservoir, FIG. 2 shows the device according to FIG. 1, with a partly liquid filled reservoir;

FIG. 4 shows a cross section according to line 1V-1V in FIG. 3,

FIG. 5 shows schematically the trajectory of light with a completely liquid filled tube according to the invention along line V-V of FIG. 4, and FIG. 6 shows a trajectory of light with a partially liquid filled tube according to the invention, along line VI-VI of FIG. 4.

Figure 3:
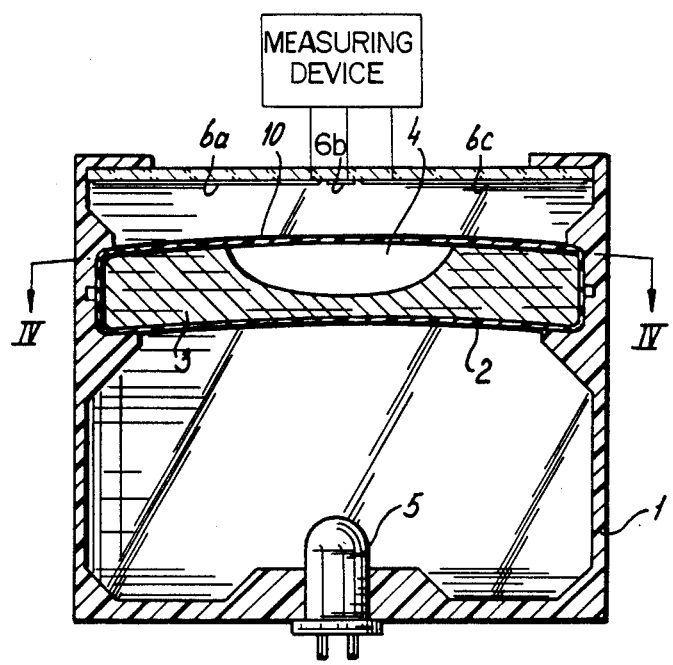
FIG. 3 shows schematically the device according to the invention.

In FIG. 1 schematically the path followed by the light according to the prior art is shown. 7 indicates incident light, 2 a tube like reservoir, 3 the liquid contained in this reservoir, 8 exiting light and 6 light detecting means. In FIG. 2 the same is shown except that the tube is not completely filled with liquid 3 but also comprises a gas bubble 4. Because of the different refractive index of gas relative to the liquid used, as shown in the figure, the parallel incident light beam will diverge. This means that in the FIG. 1 case a strong signal is obtained on light detecting means 6 whilst in the FIG. 2 situation a less intense signal is obtained. However, there is still light incident on light detecting means 6, which means that the light detecting means 6 must be able to discriminate between more and less light. This means that when during production or use, variations occur affecting the quantity of light detected by light detecting means 6, corresponding adaptions have to be made. The invention provides a solution for this problem and a preferred embodiment of it is schematically shown in FIG. 3. This embodiment comprises a frame 1 in which a tube-like element 2 is mounted. Also light emitting diode 5 is arranged in the frame 1 as well as light detecting means 6a, 6b, and 6c. As shown in the cross section of FIG. 4 tube 2 is provided at its upper side with a dark line or shield 10. From FIGS. 5 and 6, being cross sections through the FIG. 4 tube 2, it is clear what effect will be obtained from displacing gas bubble 4 through tube 2. Comparing FIG. 5 and FIG. 1 there will not be a large difference except that the light following the center line is blocked in the embodiment of FIG. 5.

However, comparing FIG. 2 and FIG. 6 indicates that because of the shield 10, no light at all will reach light detecting means 6. Because of this an on/off configuration is obtained being less sensitive for variations occurring during use or production. The reason that three light detecting means are used is based on the fact that the light detecting means which are used are so called light dependent resistors. These resistors only measure the quantity of light incident. If it is e.g. given that a balance situation is obtained if half of LDR 6a is radiated, during tilting of tube 2 clockwise this balance position will be disrupted. However, as soon as gas bubble 4 hits the left extremity of tube 2 its length will decrease by increasing its cross sectional area. An air chamber will be formed at the left side and it is possible that the length of the air bubble substantially corresponds with the balanced position of LDR 6a. To prevent this, much smaller LDR 6b is provided such that in this error situation there is a signal from LDR 6b, which is not the case if there is a balanced position. This LDR 6b can also be used for automatically switching to another tube 2 being arranged perpendicular with regard to tube 2 shown. This permits horizontal-vertical use of the inclination gauge.

Although the embodiment shown in the drawing is preferred at the time being, many amendments can be made without leaving the scope of protection as defined by the appended claims.

I claim:

1. Inclination gauge comprising a reservoir, containing a clear liquid and a gas bubble, light emitting and light detecting means arranged at opposed positions with regard to said reservoir, the refractory index of the liquid, of the gas and of the tube material being chosen such that light going through the reservoir completely filled with liquid follows a trajectory substantially differing from the trajectory followed by light traversing the reservoir at least partially filled with gas, wherein on the center line in the path from the light emitting means and detecting means near the point of egress of light from the reservoir a shield is provided, arranged such that rectilinear transmittal of light from the light emitting means to the light detecting means through the gas bubble is substantially completely blocked.

2. Inclination gauge according to claim 1, wherein the surface area of said shield is as least as large as the effective surface area of said light detecting means.

3. Inclination gauge according to claim 1, wherein said light detecting means comprise at least three light sensitive members arranged in line, two outermost ones having a larger extent than a center one.

4. Inclination gauge according to claim 3, wherein the extent of at least one of the outermost light sensitive members substantially equals the length of the gas bubble in the balanced position of the inclination gauge.

5. Inclination gauge according to claim 1, wherein the reservoir comprises a tube-like body, of which in the position of use an upper part is internally curved.

6. Inclination gauge according to claim 1, wherein said means for emitting light comprises a light emitting diode.

7. Inclination gauge according to claim 1, wherein said means for detecting of light are connected with a measuring device.

* * * * *